(12) United States Patent
Yang et al.

(10) Patent No.: US 12,547,906 B2
(45) Date of Patent: Feb. 10, 2026

(54) METHOD, DEVICE, AND PROGRAM PRODUCT FOR TRAINING MODEL

(71) Applicant: Dell Products L.P., Round Rock, TX (US)

(72) Inventors: Wenbin Yang, Shanghai (CN); Zijia Wang, WeiFang (CN); Jiacheng Ni, Shanghai (CN); Qiang Chen, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 766 days.

(21) Appl. No.: 17/687,918

(22) Filed: Mar. 7, 2022

(65) Prior Publication Data

US 2023/0229935 A1 Jul. 20, 2023

(30) Foreign Application Priority Data

Jan. 20, 2022 (CN) .......................... 202210068357.8

(51) Int. Cl.
*G06N 5/022* (2023.01)

(52) U.S. Cl.
CPC ................... *G06N 5/022* (2013.01)

(58) Field of Classification Search
CPC .......... G06N 5/022; G06N 3/045; G06N 7/01; G06N 20/00; G06N 3/088; G05B 23/0281
See application file for complete search history.

(56) References Cited

U.S. PATENT DOCUMENTS

| 11,205,098 | B1 * | 12/2021 | Wu ........................... G06T 7/70 |
| 2012/0089552 | A1 * | 4/2012 | Chang ..................... G06F 16/68 |
| | | | 706/52 |
| 2020/0285944 | A1 * | 9/2020 | Lee ........................ G06F 18/24 |
| 2021/0248181 | A1 * | 8/2021 | Zhang ................... G06F 18/251 |
| 2021/0312208 | A1 * | 10/2021 | Wang ..................... G06N 3/045 |
| 2021/0357698 | A1 * | 11/2021 | Murasaki .................. G06T 7/00 |

(Continued)

OTHER PUBLICATIONS

J. Pang et al., "Quasi-Dense Similarity Learning for Multiple Object Tracking," arXiv:2006.06664v4, Sep. 8, 2021, 16 pages.

(Continued)

*Primary Examiner* — Mariela Reyes
*Assistant Examiner* — Evel Honore
(74) *Attorney, Agent, or Firm* — Ryan, Mason & Lewis, LLP

(57) ABSTRACT

The present disclosure relates to a method, a device, and a program product for training a model. The method includes: receiving at least one unlabeled sample and at least one labeled sample for training a pre-training model, the pre-training model being used to extract features of the samples; creating an undirected graph associated with the pre-training model using the at least one unlabeled sample and a set of training samples associated with the pre-training model; dividing the undirected graph to form a plurality of sub-graphs based on corresponding features of the unlabeled sample and the set of training samples, the plurality of sub-graphs corresponding to a plurality of classifications of the samples, respectively; and training, based on the plurality of sub-graphs and the at least one labeled sample, the pre-training model to generate a training model. A corresponding device and a corresponding computer program product are provided.

20 Claims, 9 Drawing Sheets

(56) References Cited

U.S. PATENT DOCUMENTS

| | | | |
|---|---|---|---|
| 2022/0092227 A1* | 3/2022 | Yin | G06F 30/13 |
| 2023/0206059 A1* | 6/2023 | Laszlo | G06N 3/082 |
| | | | 706/25 |
| 2023/0229935 A1* | 7/2023 | Yang | G06N 3/045 |
| | | | 706/12 |
| 2024/0353829 A1* | 10/2024 | Wang | G05B 23/0281 |

OTHER PUBLICATIONS

Y. Yu et al., "Learning Diverse and Discriminative Representations via the Principle of Maximal Coding Rate Reduction," arXiv:2006.08558v1, Jun. 15, 2020, 28 pages.

Y. Zou et al., "Confidence Regularized Self-Training," arXiv:1908.09822v3, Jul. 15, 2020, 16 pages.

U. Von Luxburg, "A Tutorial on Spectral Clustering," arXiv:0711.0189v1, Nov. 1, 2007, 32 pages.

Y. Yang et al., "FDA: Fourier Domain Adaptation for Semantic Segmentation," arXiv:2004.05498v1, Apr. 11, 2020, 11 pages.

A. Milan et al., "MOT16: A Benchmark for Multi-Object Tracking," arXiv:1603.00831v2, May 3, 2016, 12 pages.

Y. Yoshida et al., "Spectral Norm Regularization for Improving the Generalizability of Deep Learning," arXiv:1705.10941v1, May 31, 2017, 12 pages.

Y. Zou et al., "Unsupervised Domain Adaptation for Semantic Segmentation via Class-Balanced Self-Training," European Conference on Computer Vision, Sep. 8-14, 2018, 17 pages.

J. Wu et al., "Deep Comprehensive Correlation Mining for Image Clustering," arXiv:1904.06925v3, Aug. 12, 2019, 13 pages.

M. Rosvall et al., "Maps of Random Walks on Complex Networks Reveal Community Structure," arXiv:0707.0609v3, Nov. 12, 2007, 62 pages.

U.S. Appl. No. 17/528,388 filed in the name of Wenbin Yang et al., filed Nov. 17, 2021, and entitled "Method, Apparatus, Electronic Device and Medium for Training Models."

* cited by examiner

METHOD, DEVICE, AND PROGRAM PRODUCT FOR TRAINING MODEL

RELATED APPLICATION(S)

The present application claims priority to Chinese Patent Application No. 202210068357.8, filed Jan. 20, 2022, and entitled "Method, Device, and Program Product for Training Model," which is incorporated by reference herein in its entirety.

FIELD

Embodiments of the present disclosure relate to the technical field of artificial intelligence. Specifically, a method, an apparatus, an electronic device, a medium, and a computer program product for training a model are provided.

BACKGROUND

With the development of artificial intelligence technology, a training mechanism of self-supervised learning has emerged. Self-supervised learning enables the use of self-defined pseudo-labels as supervision to avoid the cost of labeling datasets, and features obtained after self-supervised learning can be used for various downstream tasks. In self-supervised learning, contrastive learning has been widely used in computer vision, natural language processing (NLP), and other fields. However, the application scenarios and performance of existing technical solutions still need to be improved.

SUMMARY

Therefore, it is desired to develop and implement technical solutions for training a model in a more efficient manner. Embodiments disclosed herein provide such technical solutions, illustratively configured to exhibit compatibility with existing training methods and to update a training model in an iterative manner based on both labeled training samples and unlabeled training samples.

According to a first aspect of the present disclosure, a method for training a model is provided. This method includes: receiving at least one unlabeled sample and at least one labeled sample for training a pre-training model, the pre-training model being used to extract features of the samples; creating an undirected graph associated with the pre-training model using the at least one unlabeled sample and a set of training samples associated with the pre-training model; dividing the undirected graph to form a plurality of sub-graphs based on corresponding features of the unlabeled sample and the set of training samples, the plurality of sub-graphs corresponding to a plurality of classifications of the samples, respectively; and training, based on the plurality of sub-graphs and the at least one labeled sample, the pre-training model to generate a training model.

According to a second aspect of the present disclosure, an electronic device is provided, including: at least one processor; a memory coupled to the at least one processor and having instructions stored therein, wherein the instructions, when executed by the at least one processor, cause the device to perform actions. The actions are used to perform the method according to the first aspect of the present disclosure.

According to a third aspect of the present disclosure, a computer program product is provided. The computer program product is tangibly stored on a non-transitory computer-readable medium and includes machine-executable instructions for implementing the method according to the first aspect of the present disclosure.

BRIEF DESCRIPTION OF THE DRAWINGS

In combination with the accompanying drawings and with reference to the following detailed description, the features, advantages, and other aspects of embodiments of the present disclosure will become more apparent, and several embodiments of the present disclosure are illustrated herein by way of examples rather than limitation. In the accompanying drawings.

DETAILED DESCRIPTION

Example embodiments of the present disclosure will be described in more detail below with reference to the accompanying drawings. Although example embodiments of the present disclosure are illustrated in the accompanying drawings, it should be understood that the present disclosure may be implemented in various forms and should not be limited by the embodiments illustrated herein. Instead, these embodiments are provided in order to make the present disclosure more thorough and complete, and to fully convey the scope of the present disclosure to those skilled in the art.

The term "include" used herein and variants thereof indicate open-ended inclusion, that is, "including but not limited to." Unless otherwise stated, the term "or" means "and/or." The term "based on" denotes "at least partially based on." The terms "one embodiment" and "one embodiment" mean "at least one embodiment." The term "another embodiment" means "at least one additional embodiment." The terms "first," "second," and the like may refer to different or the same objects. Other explicit and implicit definitions may also be included below.

Figure 1:
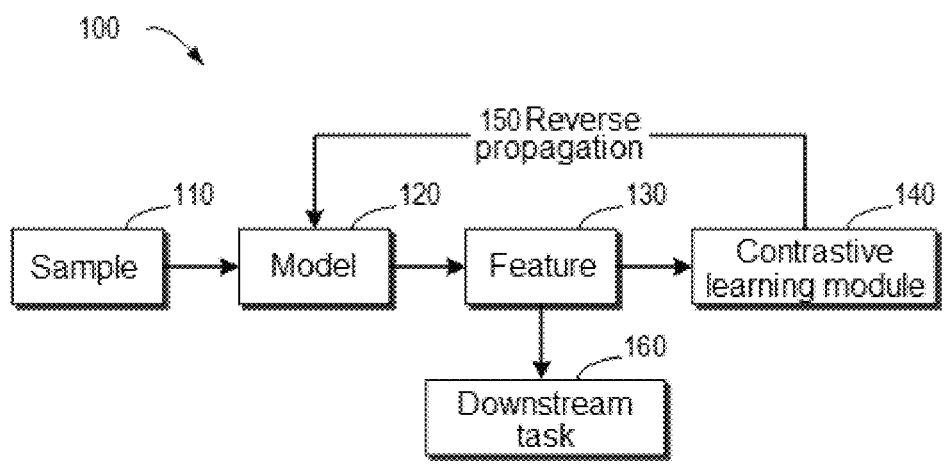
FIG. 1 illustrates a schematic diagram of an example environment in which embodiments of the present disclosure can be implemented.

Basic principles and illustrative embodiments of the present disclosure will be described below with reference to the accompanying drawings. It should be understood that the illustrative embodiments disclosed herein are provided by way of example only, to enable those skilled in the art to better understand and thus implement illustrative embodiments of the present disclosure, and are not intended to limit the scope of the present disclosure in any way. Hereinafter, an application environment according to an embodiment of the present disclosure will be described with reference to FIG. 1. FIG. 1 illustrates a schematic diagram of example environment 100 in which a plurality of embodiments of the present disclosure can be implemented. In environment 100, samples 110 are input to model 120 to be trained. Samples 110 may include positive samples and negative samples.

For ease of description, the process of model training is described in the application environment of object tracking. For example, in environments such as autonomous driving and traffic status monitoring, a large amount of video data may be continuously captured. For example, in an autonomous driving environment, one or more image capture devices may be deployed at a vehicle in order to separately capture data of an environment around the vehicle. One or more objects (e.g., vehicles, etc.) may be identified and tracked based on the captured video data. For example, in the case where the sample is an image, it is possible to label whether an image pair represents the same object. In this case, the original image pair may be classified as representing the same object (positive samples) or representing different objects (negative samples).

Model 120 is used to generate corresponding feature 130 from samples 110. Hereinafter, feature 130 may also be referred to as one or more representations or embeddings. Model 120 may be any existing machine learning model or any machine learning model to be developed in the future, e.g., support vector machine, decision tree, neural network model (e.g., convolutional neural network, recurrent neural network, graph neural network), etc. Model 120 may include an input layer, a hidden layer, and an output layer. Each layer has several nodes, and each node receives an output of nodes of a previous layer and generates an output to nodes of a subsequent layer according to a connection weight of inter-layer nodes. The output of each layer is regarded as a vector. Generally, the number of nodes in the input layer may correspond to the dimension of sample data input to model 120, and the number of nodes in the output layer may correspond to the dimension of feature 130 output by model 120. The features may be 128-, 256-, and 512-dimensional vectors, which is not limited in the present disclosure.

In environment 100, feature 130 may be provided to contrastive learning module 140 so as to train model 120. Training herein refers to a process of adjusting or updating connection weights in model 120 based on feature 130 output by model 120. Contrastive learning module 140 calculates a loss function for the training data based on feature 130, and updates model 120 iteratively by minimizing the loss function. In some embodiments, contrastive learning module 140 may provide gradient information about the loss function to model 120 through reverse propagation 150 such that model 120 is updated according to a gradient descent method.

In environment 100, the training process may be performed in an iterative manner, and the trained model 120 may extract feature 130 and provide it to downstream task 160, which may include, for example, object recognition or other tasks of the type described above, including, but not limited to, image classification, target detection, action recognition, etc. It should be noted that the purpose of training for contrastive learning is to enable the trained model 120 to generate similar features for samples of the same classification, and to generate features that differ significantly for samples of different classifications.

Contrastive learning techniques have been proposed for applying unsupervised training to real-world data. Currently, most contrastive learning frameworks are constructed based on the assumption that sample pairs are known. However, in real-world application scenarios such as object tracking and image classification described above, both labeled samples and unlabeled samples are usually used to learn differences between samples of different classifications in order to reduce the amount of training data of labeled samples required. In this case, the contrastive learning techniques cannot be directly applied to the above application scenarios.

In order to at least partially address the above deficiencies, according to an embodiment of the present disclosure, a technical solution for performing contrastive learning based on both labeled samples and unlabeled samples is provided. For example, the technical solution of Self-Evolving Contrastive Training (abbreviated as SECT) is provided in embodiments of the present disclosure. With the entropy loss principle, this technical solution may perform contrastive learning in each iteration by optimizing "Oil-Water Separation" (abbreviated as OWS) to achieve training purposes.

In the initial stage of training, the features of samples may be extracted based on a pre-training model (e.g., a model preliminarily trained using a known technical solution). As time passes, this pre-training model may be further trained with more subsequent samples. With the SECT technical solution, without having to label each subsequent sample one by one, training can be performed using unlabeled samples. Specifically, self-evolving contrastive training may be used to minimize the entropy of the entire application system. In this manner, the self-evolving contrastive training technical solution of the present disclosure can be applied to a variety of application environments. Hereinafter, an overview of an embodiment according to the present disclosure will be described with reference to FIG. 2.

Figure 2:
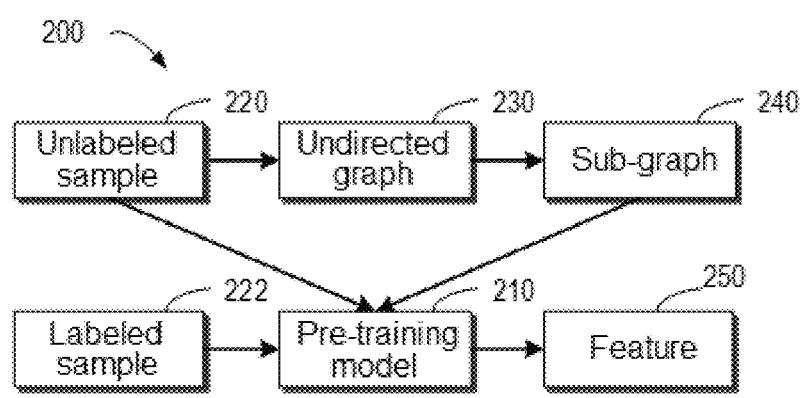
FIG. 2 schematically illustrates a block diagram of a process for training a model according to an embodiment of the present disclosure.

FIG. 2 schematically illustrates block diagram 200 of a process for training a model according to an embodiment of the present disclosure. Pre-training model 210 and samples 220 and 222 for training the pre-training model 210 may be received. In an object recognition environment, samples 220 and 222 may include image data captured by image capture devices. In this case, the samples may include at least one unlabeled sample 220 and at least one labeled sample 222. Undirected graph 230 associated with pre-training model 210 may be created using the at least one unlabeled sample 220 and a set of training samples associated with pre-training model 210. It will be understood that the method according to an embodiment of the present disclosure may be applied iteratively and an undirected graph from a previous round may be directly used. That is, the undirected graph of the previous round may be updated using the at least one unlabeled sample 220.

Undirected graph 230 may be divided based on corresponding features of the unlabeled sample and the set of training samples to form a plurality of sub-graphs 240, where the plurality of sub-graphs 240 may correspond to a plurality of classifications of samples, respectively. Further, this pre-training model 210 may be trained based on the plurality of sub-graphs 240 and the at least one labeled sample 222 to generate a training model. In this manner, pre-training model 210 may be updated based on labeled sample 222 and unlabeled sample 220, thereby incrementally improving the quality of the training model.

In some embodiments of the present disclosure, labeled samples and unlabeled samples can be leveraged fully to train models for different purposes. Compared with existing technical solutions, the self-evolving contrastive training technical solution has better robustness and can perform training iteratively using new unlabeled samples that are continuously captured at a later stage. In this way, the need of a large number of labeled samples during training can be reduced, and higher accuracy can be achieved.

Figure 3:
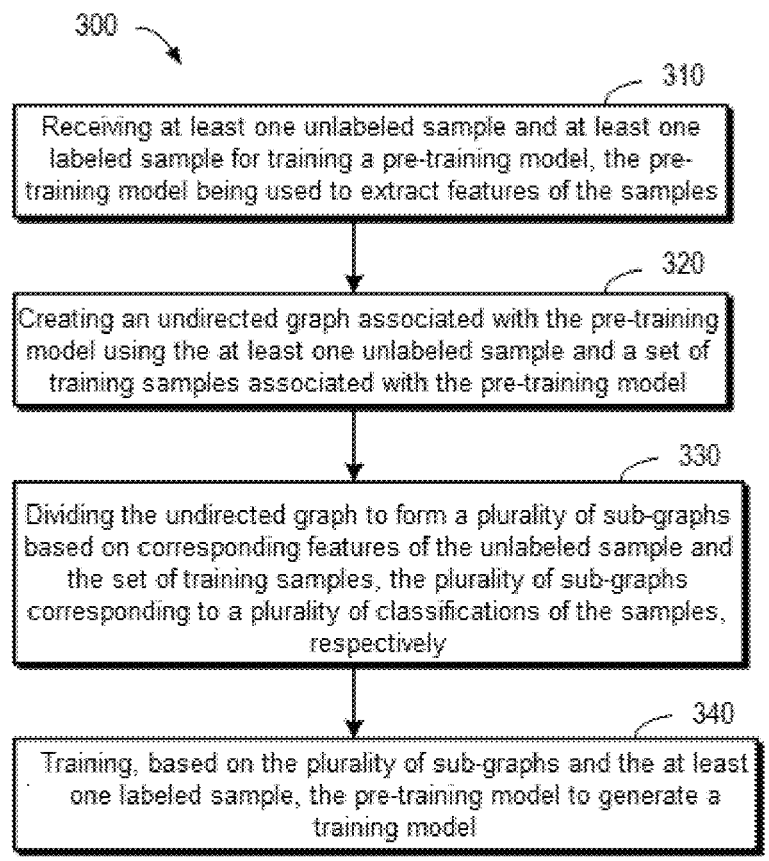
FIG. 3 schematically illustrates a flow chart of a method for training a model according to an embodiment of the present disclosure.

Hereinafter, more details of the training of a model are described with reference to FIG. 3. FIG. 3 schematically illustrates a flow chart of method 300 for training a model according to an embodiment of the present disclosure. As shown in FIG. 3, at block 310, at least one unlabeled sample 220 and at least one labeled sample 222 for training pre-training model 210 may be received. Here, pre-training model 210 may extract features 250 of the samples, and this pre-training model 210 may be obtained according to a variety of techniques currently known and/or to be developed in the future. According to an embodiment of the present disclosure, for ease of description, the set of unlabeled samples may be represented as $X_U$, and the set of labeled samples may be represented as $X_L$.

Figure 4:
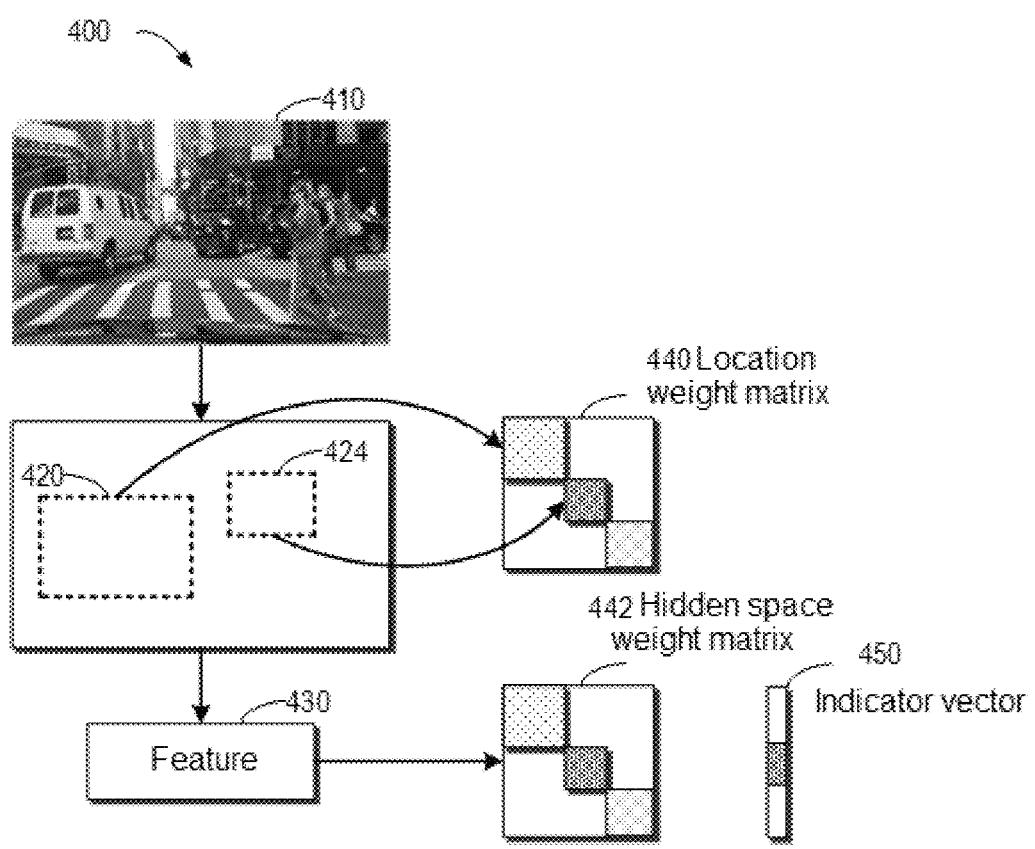
FIG. 4 schematically illustrates a block diagram of a process for training a model in an object recognition environment according to an embodiment of the present disclosure.

Hereinafter, more information about samples will be described with reference to FIG. 4. FIG. 4 schematically illustrates a block diagram of process 400 for training a model in an object recognition environment according to an embodiment of the present disclosure. Image 410 may be continuously captured so as to identify vehicles in image 410. Potential regions of interest 420 and 424 in image 410 may be determined to serve as input samples. Here, samples may include labeled samples and unlabeled samples. The potential regions of interest 420 and 424 are associated with a location weight matrix 440 as shown in FIG. 4.

Returning to FIG. 3, at block 320, an undirected graph associated with pre-training model 210 may be created using the at least one unlabeled sample 220 and a set of training samples associated with pre-training model 210. The concepts associated with the undirected graph will be first introduced. The undirected graph G may be described using a set of nodes V and a set of edges E: G(V, E), where V includes all the nodes $(v_1, v_2, \ldots, v_n)$ in the set of samples. According to an embodiment of the present disclosure, for the unlabeled sample and a first sample and a second sample in the set of training samples, a first node and a second node in the undirected graph corresponding to the first sample and the second sample, respectively, may be determined. For example, $v_1$ may correspond to the first sample, $v_2$ may correspond to the second sample, and so on.

For any two nodes in V, there may or may not be an edge connection, and $w_{ij}$ may be used to represent the weight between the two nodes $v_i$ and $v_j$. For the undirected graph, $w_{ij}=w_{ji}$. According to an embodiment of the present disclosure, each node in the undirected graph may correspond to one sample, and an edge between two nodes may represent an association between the corresponding samples for the two nodes. According to an embodiment of the present disclosure, a first feature and a second feature of the first sample and the second sample may be determined, respectively, based on the pre-training model. An edge between the first node and the second node is determined based on a similarity between the first feature and the second feature.

For two nodes $v_i$ and $v_j$ between which there is an edge connection, $w_{ij}>0$; and for two nodes $v_i$ and $v_j$ between which there is no edge connection, $w_{ij}=0$. For any node $v_i$ in the graph, its degree $d_i$ is defined as the sum of the weights of all the edges connected thereto, i.e.:

$$d_i = \sum_{j=1}^{L} w_{ij} \quad \text{Equation (1)}$$

A weight matrix $W \in R^{N \times N}$ may be defined, and correspondingly a diagonal matrix $D \in R^{N \times N}$ is defined, where its elements $D_{ii}=d_i$. For a given sub-graph A of the graph G, the size of the sub-graph A is defined as follows:

$$vol(A) = \sum_{i \in A} d_i \quad \text{Equation (2)}$$

where vol(A) denotes the size of sub-graph A by summing the weights of all edges connected to the nodes in sub-graph A. Then, for two disjoint sub-graphs A and B of graph G, a dividing score may be defined as follows:

$$cut(A, B) = \sum_{i \in A, j \in B} w_{ij} \quad \text{Equation (3)}$$

According to an embodiment of the present disclosure, the element $w_{ij}$ in the weight matrix W may use, but is not limited to, the similarity associated with the two vertices $v_i$ to $v_j$. For example, a cosine similarity expressed in the following equation may be used:

$$w_{ij} = sim(v_i, v_j) = \frac{z_i^T z_j}{|z_i||z_j|} \quad \text{Equation (4)}$$

where z=embedding(v), and embedding(v) denotes a feature function for converting data sample v into feature z. In this case, the weight matrix W may be referred to as a similarity matrix.

According to an embodiment of the present disclosure, the weight of an edge may be updated based on a perturbation factor describing sample noise. Consider the possibility of perturbation in the data samples themselves; such perturbation may be interpreted as a random shift between positive sample data and negative sample data. Thus, in order to improve the robustness of the training method, the perturbation factor τ may be used to adjust the elements in the similarity matrix:

$$w_{ij} = (1 - \tau)w_{ij} + \frac{\tau}{N} \quad \text{Equation (5)}$$

where 0<τ<1 represents a perturbation level. According to an embodiment of the present disclosure, τ may be gradually reduced during the training process in order to simulate the real world.

At block 330 of FIG. 3, the undirected graph may be divided based on corresponding features of the unlabeled sample and the set of training samples to form a plurality of sub-graphs, the plurality of sub-graphs corresponding to a plurality of classifications of the samples, respectively. In FIG. 4, feature 430 of each sample may be determined, and further, an associated hidden space weight matrix 442 may be determined. Specifically, an entropy loss associated with the undirected graph may be determined based on the edges of the undirected graph, and the undirected graph may then be divided to form a plurality of sub-graphs based on the entropy loss.

Figure 5:
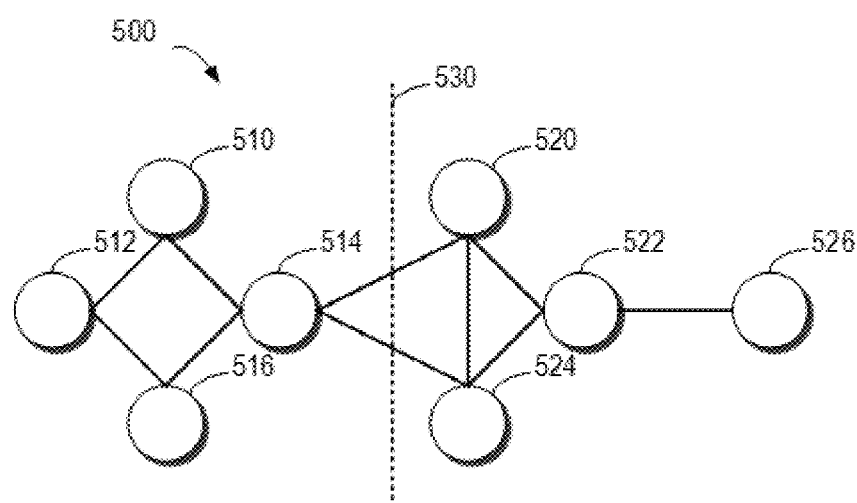
FIG. 5 schematically illustrates a block diagram of sub-graph dividing according to an embodiment of the present disclosure.

Hereinafter, the concept of sub-graph dividing will be introduced. For contrastive learning graph G, a positive sub-graph A and a negative sub-graph $\overline{A}$ may be defined, and the contrastive learning technical solution may enable positive sample pairs to be close to each other and to stay away from negative sample pairs. More details of sub-graph dividing will be described with reference to FIG. 5. FIG. 5 schematically illustrates block diagram 500 of sub-graph dividing according to an embodiment of the present disclosure. Dashed line 530 in FIG. 5 may divide a plurality of nodes into a plurality of sub-graphs. For example, nodes 510, 512, 514, and 516 on the left side of the dashed line are located in one sub-graph, and nodes 520, 522, 524, and 526 on the right side of the dashed line are located in another sub-graph.

According to an embodiment of the present disclosure, solving the entropy minimization problem in OWS may be converted to finding the weight matrix and thus determining the sub-graph dividing. Specifically, an indicator vector (e.g., indicator vector 450 in FIG. 4) associated with a sub-graph in the plurality of sub-graphs may be determined, and the entropy loss may be determined based on a separation degree between indicator vector 450 and the plurality of sub-graphs. The indicator vector $h \in R^{L \times 1}$ may be defined in the following manner:

$$h_i = \begin{cases} 0, & v_i \notin A \\ \dfrac{1}{\sqrt{vol(A)}}, & v_i \in A \end{cases} \qquad \text{Equation (6)}$$

At this point, the OWS learning loss function may be defined as follows:

$$l_{OWS}(G_n) = tr(h^T L h) = \dfrac{cut(A, \overline{A})}{vol(A)} \qquad \text{Equation (7)}$$

where tr( ) denotes the trace of the matrix. From Equation (7), it can be found that cut(A, $\overline{A}$) can keep negative sample pairs away from each other, while vol(A) can keep positive sample pairs close to each other. Thus, the value of tr($h^T L h$) separates positive samples from negative samples, and a smaller value indicates a greater degree of differentiation of the learned features.

For unlabeled samples, a known embedding function may be used to determine the features in the hidden space and subsequently obtain hidden space weight matrix 442. The definition of OWS may be used to determine the minimized system entropy (i.e., the optimal dividing) by solving the following equation:

$$\arg\min_{h} tr(h^T L h) \text{ s.t. } h^T D h = 1 \qquad \text{Equation (8)}$$

Equation (8) belongs to the NP (Non-deterministic Polynomial) problem, which may be solved based on the ED (Eigenvalue Decomposition) method. A normalized feature map $\overline{W} = D^{-1/2} W D^{-1/2}$ may be defined, in which case Equation (8) may be converted to:

$$\arg\min_{f} tr(1 - f^T(D^{-1/2} W D^{-1/2})f) \text{ s.t. } f^T f = 1 \qquad \text{Equation (9)}$$

The optimal value f is the feature of $\overline{W}$ that has the largest feature vector. Subsequently, the indicator vector $h = D^{-1/2} f$. The ED method may be implemented based on a machine learning network. Subsequently, the optimal dividing may generate sub-graphs for both positive samples and negative samples. According to an embodiment of the present disclosure, Equation (8) may be extended to the following form:

$$\arg\min_{H} tr(H^T L H) \text{ s.t. } H^T D H = I \qquad \text{Equation (10)}$$

Similarly, for L samples included in graph G, feature vectors (one or more feature vectors may exist) corresponding to at most K(K<L) features are selected, and subsequently one feature vector is selected (e.g., randomly) from these feature vectors. In this way, the OWS-based loss evaluation may be expressed as follows:

$$l_{OE}(G_n)^{(1)} = tr(\hat{h}^T L \hat{h}) \qquad \text{Equation (11)}$$

Figure 6:
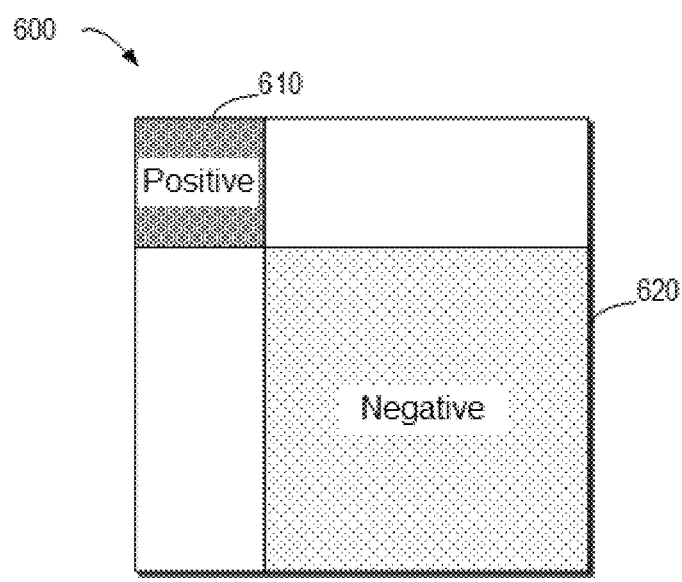
FIG. 6 schematically illustrates a block diagram of a weight matrix according to an embodiment of the present disclosure.

The sub-graph dividing may be determined based on the equations described above. FIG. 6 schematically illustrates block diagram 600 of a weight matrix according to an embodiment of the present disclosure. In FIG. 6, reference numeral 610 illustrates a positive sample-related region, and reference numeral 620 illustrates a negative sample-related region. In this manner, positive samples can be made as concentrated and away from negative samples as possible.

Returning to FIG. 3, at block 340, pre-training model 210 may be trained based on the plurality of sub-graphs and the at least one labeled sample to generate a training model. According to an embodiment of the present disclosure, the overall loss of the training model may be divided into two parts: an entropy loss for updating the pre-training model is determined based on a plurality of sub-graphs, and a priori knowledge loss for updating the pre-training model is determined based on a priori knowledge. Further, pre-training model 210 may be updated based on the entropy loss and the a priori knowledge loss.

It will be understood that for density prediction in multiple object tracking, low-level adjacency information may be used as the a priori knowledge. As shown in FIG. 4, the Region of Interest (abbreviated as RoI) location is an example of important a priori knowledge in the multiple object tracking task. Thus, the use of the a priori knowledge can provide the final evaluation in the following way:

$$l_{OE}(G_n) = tr(\hat{h}^T W \hat{h}) + \gamma tr(\hat{h}^T W_p \hat{h}) \qquad \text{Equation (12)}$$

where $\gamma > 0$, which is used to control the impact of the a priori knowledge. According to an embodiment of the present disclosure, a priori knowledge not only can accelerate convergence, but also can add semantic meaning to the learned features.

A two-stage detector may be used in the multiple object tracking, which uses a Region Proposal Network (abbreviated as RPN) to generate a region of interest. In MOT, contrastive learning may be used to obtain robust embeddings for use in target tracking. Meanwhile, in the location space, two RoIs are defined as a positive sample pair (if they have a high Intersection over Union (IoU)).

According to an embodiment of the present disclosure, based on the entropy loss and the a priori knowledge loss, the overall loss for updating pre-training model 210 may be determined for use in updating the parameters of pre-training model 210. Specifically, the loss of the unlabeled samples may be expressed as $l_{OE}$, and thus the overall loss of contractive self-training may be defined as follows:

$$L = \sum_{n=1}^{N} (\lambda l_{OWS}(G_n) + (1-\lambda) l_{OE}(G_n)) \qquad \text{Equation (13)}$$

If implicit features come from the labeled samples, then $\lambda=1$, and vice versa. According to an embodiment of the present disclosure, the SECT solution may be implemented based on the equation described above. Similar to the unsupervised learning EM algorithm, the SECT solution includes two parts: sub-graph dividing (feature generation and dividing) and loss maximization (model training). Specifically, in an anticipation part, an unlabeled sample may be received, and corresponding features may be generated for the unlabeled sample. Subsequently, the generated features may be divided to obtain corresponding sub-graphs. Next, in the loss maximization part, a training process may be performed based on the obtained sub-graphs and using both the labeled samples and the unlabeled samples.

Figure 7:
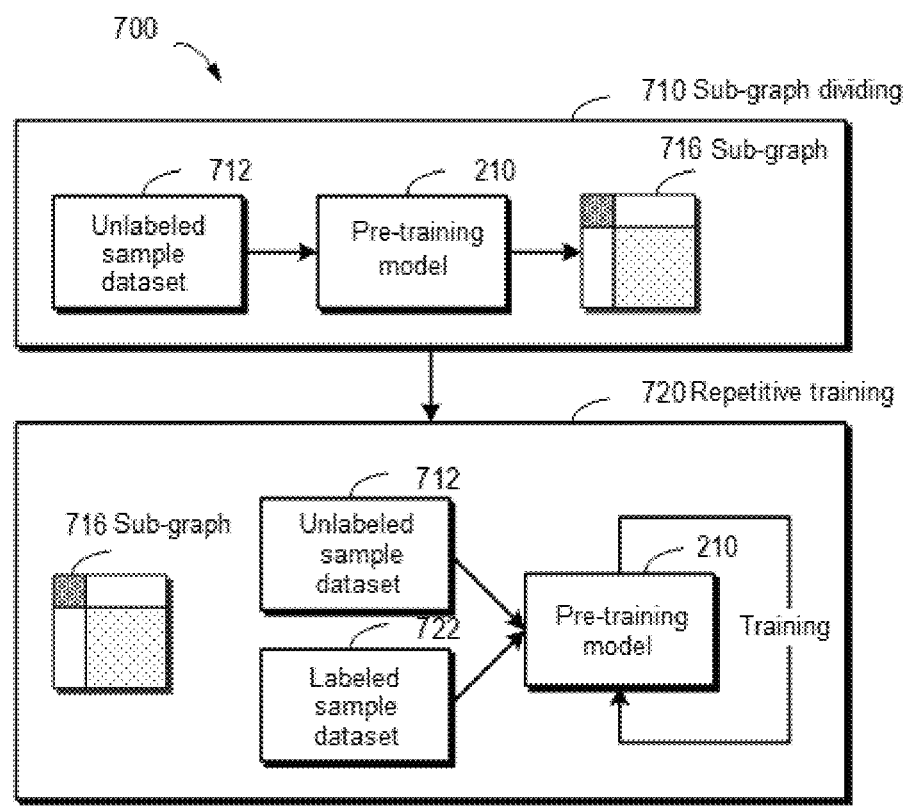
FIG. 7 schematically illustrates a block diagram of a process for training a model according to an embodiment of the present disclosure.

According to an embodiment of the present disclosure, method 300 may be executed iteratively using the at least one unlabeled sample and the at least one labeled sample. In a training round, features may be generated for a density prediction problem and the loss may be used to estimate sub-graph dividing. Subsequently, the model training module may update the entire feature extraction model using a unified training strategy (which considers both the labeled and unlabeled samples). FIG. 7 schematically illustrates a block diagram of process 700 for training a model according to embodiments of the present disclosure. As shown in FIG. 7, each round in the overall training process may include two parts: sub-graph dividing 710 and repetitive training 720.

As shown in FIG. 7, in sub-graph dividing 710, pre-training model 210 may be used to process samples in unlabeled sample dataset 712 and thus obtain corresponding features. The undirected graph for the current round may be generated based on the obtained features and the undirected graph for the previous round. Further, sub-graph 716 of the undirected graph may be determined. In repetitive training 720, sub-graph 716, unlabeled sample dataset 712, and labeled sample dataset 722 may be used to construct the overall loss based on the equations described above in order to train this pre-training model 210 toward minimizing the overall loss.

According to an embodiment of the present disclosure, a convergence condition may be specified in advance, and the training process may be stopped when the training reaches that convergence condition. In this manner, the training process may be performed iteratively as new image data is continuously captured, thereby obtaining features that can more accurately describe information about various aspects of the samples.

The pseudo-code for implementing the SECT technical solution described above is illustrated in Table 1 below. In some embodiments of the present disclosure, samples may be converted into positive and negative sample pairs depending on the specific application context. For example, for a classification problem, graphs may be created based on batches, and in a quasi-dense MOT, RoI may be densely sampled to construct graphs.

TABLE 1

Algorithm for implementing SECT

Algorithm 1: SECT

Input : Pre-training model; Dataset $X_L$ and $X_U$; Perturbation level $\tau$
Output: Fine-tune model
while not converged do
  | Randomly sample $S_u$ unlabeled examples from $X_u$ ;
  | for x ∈ $S_u$ do
  |   | Turn x to graph $\mathcal{G}$ (According to applications);
  |   | Compute the sub-graph cutting ;
  |   | Compute $l_{OE}$ with Equation 12 ;
  | end
  | Sample R instances from $X_L$ and compute the $l_{OWS}$
  | with Equation 7 ;
  | Compute $l_{OWS}$ with Equation 13;
  | Re-train model and update parameters θ ;
end
return As shown in Table 1, the input data for the SECT technical solution include: a pre-training model, a set of labeled samples $X_L$, and a set of unlabeled samples $X_U$. Further, the input data may include a perturbation factor $\tau$. In the SECT technical solution, the training process may be performed continuously until the obtained model satisfies a predetermined convergence condition. Specifically, an unlabeled sample $S_U$ may be randomly selected from the set of unlabeled samples $X_U$, and the following operations may be performed for that unlabeled sample $S_U$. The information associated with the unlabeled sample $S_U$ may be added to the graph for the previous round in order to obtain an updated graph $G_n$. A dividing process may be performed in order to determine the corresponding sub-graphs, and the corresponding $l_{OE}(G_n)$ may be determined using Equation (12).

Further, R samples may be acquired from the labeled sample dataset $X_L$, and Equation (7) may be used to determine the associated loss function $l_{OWS}(G_n)$ for OWS learning. Subsequently, Equation (13) may be used to determine the overall loss L. The model may be continuously trained based on the above process, and the parameters θ in the model may be updated until the predetermined convergence condition is satisfied.

In some embodiments of the present disclosure, the SECT technical solution may reduce the need for labeled samples and increase the accuracy of the model. Specifically, minimizing Equation (10) is equivalent to maximizing the sum of the first K largest features of $\overline{W}$. In one self-training iteration, the process of minimizing the entropy of unlabeled sample data is represented as follows:

$$\underset{W}{\arg\min} \left( \underset{F}{\arg\min}\ tr(I - F^T \overline{W} F) \right) \qquad \text{Equation (14)}$$

The above optimization problem is a dual minimization problem. Better learning of the learned features can be obtained by using the information about the labeled samples. It will be understood that, since different vectors represent different sub-graph dividing, the randomness of a superstate during the selection of representation vectors can improve the robustness of the algorithm and thus avoid getting into local suboptimal solution situations. In addition, relative to classification entropy-based methods, the technical solution of the present disclosure is linear in terms of embedding loss and feature evaluation, which makes it easy to construct a learning objective, and that learning objective can adequately measure the merit of the feature representation. Further, the OWS-based measure does not explicitly rely on classification labels and thus can be more suitable for use in supervised, self-supervised, semi-supervised, and unsupervised training processes. With some embodiments of the present disclosure, the self-evolving feature learning problem may be described in terms of entropy minimization.

According to an embodiment of the present disclosure, a uniform training model may be provided. In some embodiments, the present disclosure provides a self-training framework SECT for contrastive training, and by using this framework, the performance of the feature extraction process can be progressively improved, thereby enabling the extracted features to more accurately reflect information about various aspects of the training samples. The SECT framework provided in embodiments of the present disclosure is intrinsically robust and, compared with existing self-training frameworks implemented based on intuitive loss/standard combinations, the SECT framework of the present disclosure has a more solid training basis as it performs training based on OWS entropy minimization.

In addition, the SECT solution of the present disclosure is easier to implement since it does not rely on large data volumes of momentum encoders, complex sample selection, or additional training conditions such as stopping gradients. Further, the SECT solution of the present disclosure provides friendly support for downstream tasks. The SECT solution of the present disclosure can be executed in a variety of application environments in order to obtain features of data to be processed in various formats. Further, the obtained features may be utilized to perform various forms of downstream tasks, such as object detection, object tracking, and the like.

Figure 8:
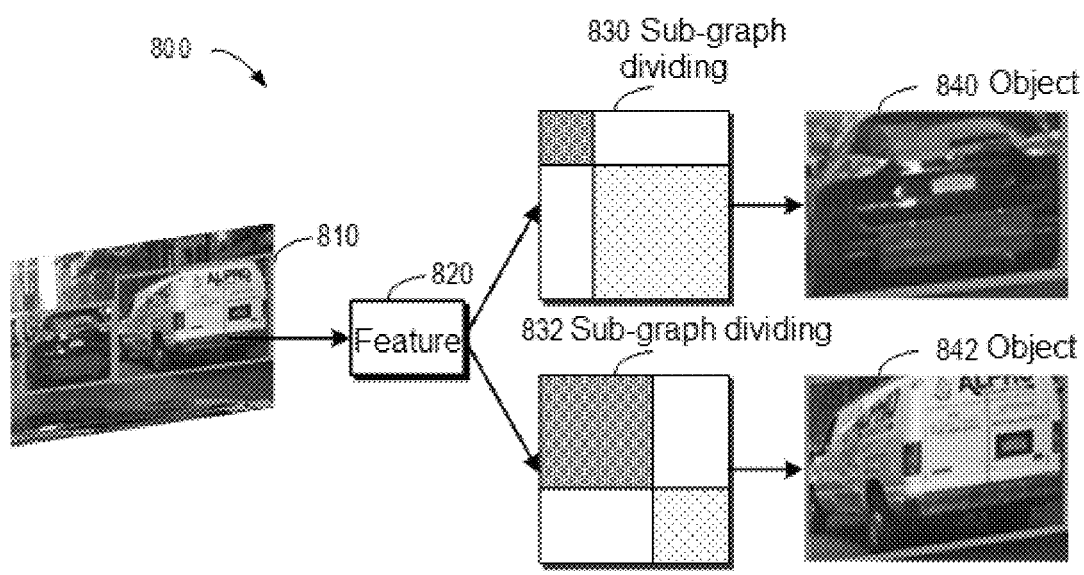
FIG. 8 schematically illustrates a block diagram of a process for Multiple Object Tracking (abbreviated as MOT) according to an embodiment of the present disclosure.

In a case where a trained model has been obtained using the method described above, that trained model may be utilized to process received new samples, in order to extract features of the new samples using the trained model. According to an embodiment of the present disclosure, the SECT solution described above may be applied to multiple object tracking. FIG. 8 schematically illustrates a block diagram of process 800 for multiple object tracking according to an embodiment of the present disclosure. As shown in FIG. 8, image 810 may be captured in real time, corresponding feature 820 may be acquired, and sub-graph including 830 and 832 associated with regions of interest may be determined. Further, multiple object tracking may be performed to extract desired objects 840 and 842 from image 810. In this manner, features of the samples can be described in a more accurate manner, which in turn improves the performance of object tracking.

Examples of the method according to the present disclosure have been described in detail above with reference to FIGS. 2 to 8, and an embodiment of a corresponding apparatus will be described below. According to an embodiment of the present disclosure, an apparatus for training a model is provided. The apparatus includes: a receiving module configured to receive at least one unlabeled sample and at least one labeled sample for training a pre-training model, the pre-training model being used to extract features of the samples; a creation module configured to create an undirected graph associated with the pre-training model using the at least one unlabeled sample and a set of training samples associated with the pre-training model; a dividing module configured to divide the undirected graph to form a plurality of sub-graphs based on corresponding features of the unlabeled sample and the set of training samples, the plurality of sub-graphs corresponding to a plurality of classifications of the samples, respectively; and a training module configured to train, based on the plurality of sub-graphs and the at least one labeled sample, the pre-training model to generate a training model. According to an embodiment of the present disclosure, the above apparatus may further include modules for executing other steps of method 300.

Figure 9:
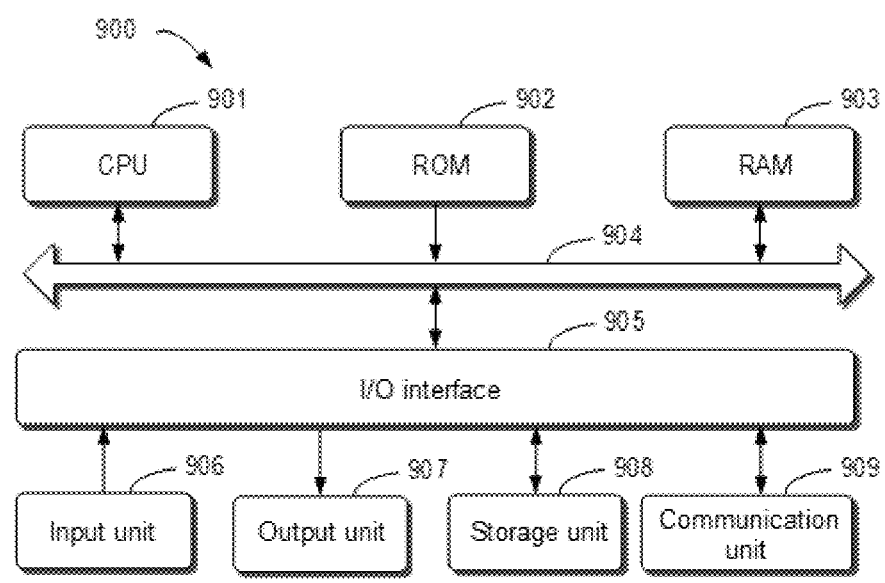
FIG. 9 schematically illustrates a block diagram of a device for training a model according to an embodiment of the present disclosure.

FIG. 9 schematically illustrates a block diagram of device 900 for training a model according to embodiments of the present disclosure. As shown in the figure, device 900 includes central processing unit (CPU) 901 that may perform various appropriate actions and processing according to computer program instructions stored in read-only memory (ROM) 902 or computer program instructions loaded from storage unit 908 to random access memory (RAM) 903. Various programs and data required for the operation of device 900 may also be stored in RAM 903. CPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing described above, such as method 300, may be executed by CPU 901. For example, in some embodiments, method 300 may be implemented as a computer software program that is tangibly included in a machine-readable medium, such as storage unit 908. In some embodiments, part of or all the computer program may be loaded and/or installed onto device 900 via ROM 902 and/or communication unit 909. One or more steps of method 300 described above may be performed when the computer program is loaded into RAM 903 and executed by CPU 901. Alternatively, in other embodiments, CPU 901 may also be configured in any other suitable manner to implement the above processes/methods.

According to an embodiment of the present disclosure, an electronic device is provided, including: at least one processor; and a memory coupled to the at least one processor and having instructions stored therein, wherein the instructions, when executed by the at least one processor, cause the device to perform actions. The actions include: receiving at least one unlabeled sample and at least one labeled sample for training a pre-training model, the pre-training model being used to extract features of the samples; creating an undirected graph associated with the pre-training model using the at least one unlabeled sample and a set of training samples associated with the pre-training model; dividing the undirected graph to form a plurality of sub-graphs based on corresponding features of the unlabeled sample and the set of training samples, the plurality of sub-graphs corresponding to a plurality of classifications of the samples, respectively; and training, based on the plurality of sub-graphs and the at least one labeled sample, the pre-training model to generate a training model.

According to an embodiment of the present disclosure, creating the undirected graph includes: determining, for the unlabeled sample and a first sample and a second sample in the set of training samples, a first node and a second node in the undirected graph corresponding to the first sample and the second sample, respectively.

According to an embodiment of the present disclosure, creating the undirected graph further includes: determining, based on the pre-training model, a first feature and a second feature of the first sample and the second sample, respectively; and determining an edge between the first node and the second node based on a similarity between the first feature and the second feature.

According to an embodiment of the present disclosure, determining the edge includes: updating the edge based on a perturbation factor describing sample noise.

According to an embodiment of the present disclosure, dividing the undirected graph to form the plurality of sub-graphs includes: determining, based on edges of the undirected graph, an entropy loss associated with the undirected graph; and dividing, based on the entropy loss, the undirected graph to form the plurality of sub-graphs.

According to an embodiment of the present disclosure, determining the entropy loss includes: determining an indicator vector associated with a sub-graph in the plurality of sub-graphs; and determining the entropy loss based on a separation degree between the indicator vector and the plurality of sub-graphs.

According to an embodiment of the present disclosure, training the pre-training model to generate the training model includes: determining, based on the plurality of sub-graphs, an entropy loss for updating the pre-training model; determining, based on a priori knowledge, a priori knowledge loss for updating the pre-training model; and updating the pre-training model based on the entropy loss and the a priori knowledge loss.

According to an embodiment of the present disclosure, updating the pre-training model includes: determining, based on the entropy loss and the a priori knowledge loss, an overall loss for updating the pre-training model; and updating a parameter of the pre-training model using the overall loss.

According to an embodiment of the present disclosure, the actions further include: iteratively executing the actions based on the at least one unlabeled sample and the at least one labeled sample.

According to an embodiment of the present disclosure, the actions further include: extracting, in response to receiving a new sample to be processed, features of the new sample using the training model.

According to an embodiment of the present disclosure, a computer program product is provided, the computer program product being tangibly stored on a non-transitory computer-readable medium and including machine-executable instructions, wherein the machine-executable instructions are used to execute the method according to the present disclosure.

According to an embodiment of the present disclosure, a computer-readable medium is provided, the computer-readable medium storing machine-executable instructions which, when executed by at least one processor, cause the at least one processor to implement the method according to the present disclosure.

Embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible embodiments of the systems, methods, and computer program products according to a plurality of embodiments of the present disclosure. In this regard, each block in the flow charts or block diagrams may represent a module, a program segment, or part of an instruction, the module, program segment, or part of an instruction including one or more executable instructions for implementing specified logical functions. In some alternative embodiments, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Example embodiments of the present disclosure have been described above. The above description is illustrative and not exhaustive, and is not limited to the various embodiments disclosed. Numerous modifications and alterations will be apparent to persons of ordinary skill in the art without departing from the scope and spirit of the illustrated embodiments. The selection of terms as used herein is intended to best explain principles and practical applications of the various embodiments or improvements to technologies on the market, so as to enable persons of ordinary skill in the art to understand the embodiments disclosed herein.

What is claimed is:

1. A method for training a model, comprising:
receiving, in a processor-based machine learning system, at least one unlabeled sample and at least one labeled sample for training a pre-training model of the processor-based machine learning system, the pre-training model being used to extract features of the samples;
creating, in the processor-based machine learning system, an undirected graph associated with the pre-training model using the at least one unlabeled sample and a set of training samples associated with the pre-training model, wherein nodes in the undirected graph correspond to respective samples of the at least one unlabeled sample and the set of training samples, and edges between respective pairs of the nodes comprise respective weights each indicating a level of similarity between a corresponding one of the pairs of nodes;
dividing, in the processor-based machine learning system, the undirected graph to form a plurality of sub-graphs based on corresponding features of the unlabeled sample and the set of training samples, the plurality of sub-graphs corresponding to a plurality of classifications of the samples, respectively, wherein the plurality of sub-graphs comprise at least a positive sub-graph and a negative sub-graph, each of the positive sub-graph and the negative sub-graph comprising a respective different subset of the nodes corresponding to the respective samples of the at least one unlabeled sample and the set of training samples, the positive and negative sub-graphs being determined utilizing a contrastive learning loss function that separates positive sample pairs each classified as representing same objects from negative sample pairs each classified as representing different objects;
training, in the processor-based machine learning system, based on the plurality of sub-graphs and the at least one labeled sample, the pre-training model to generate a training model of the processor-based machine learning system;
wherein the training model is utilized to process at least portions of a plurality of images from captured video data as multiple additional samples, the processing comprising detecting at least first and second objects associated with respective regions of interest in at least one of the images and tracking the at least first and second detected objects across multiple additional images of the plurality of images, using the training model and one or more instances of dividing a corresponding undirected graph into sub-graphs each comprising a positive sub-graph and a negative sub-graph.

2. The method according to claim 1, wherein creating the undirected graph comprises: determining, for the unlabeled sample and a first sample and a second sample in the set of training samples, a first node and a second node in the undirected graph corresponding to the first sample and the second sample, respectively.

3. The method according to claim 2, wherein creating the undirected graph further comprises:
determining, based on the pre-training model, a first feature and a second feature of the first sample and the second sample, respectively; and
determining an edge between the first node and the second node based on a similarity between the first feature and the second feature.

4. The method according to claim 3, wherein determining the edge comprises:

updating the edge based on a perturbation factor describing sample noise.

5. The method according to claim 3, wherein dividing the undirected graph to form the plurality of sub-graphs comprises:
determining, based on edges of the undirected graph, an entropy loss associated with the undirected graph; and
dividing, based on the entropy loss, the undirected graph to form the plurality of sub-graphs.

6. The method according to claim 5, wherein determining the entropy loss comprises:
determining an indicator vector associated with a sub-graph in the plurality of sub-graphs; and
determining the entropy loss based on a separation degree between the indicator vector and the plurality of sub-graphs.

7. The method according to claim 1, wherein training the pre-training model to generate the training model comprises:
determining, based on the plurality of sub-graphs, an entropy loss for updating the pre-training model;
determining, based on a priori knowledge, a priori knowledge loss for updating the pre-training model; and
updating the pre-training model based on the entropy loss and the a priori knowledge loss.

8. The method according to claim 7, wherein updating the pre-training model comprises:
determining, based on the entropy loss and the a priori knowledge loss, an overall loss for updating the pre-training model; and
updating a parameter of the pre-training model using the overall loss.

9. The method according to claim 1, further comprising: iteratively executing the method based on the at least one unlabeled sample and the at least one labeled sample.

10. The method according to claim 1, further comprising: extracting, in response to receiving a new sample to be processed, features of the new sample using the training model.

11. An electronic device, comprising:
at least one processor; and
memory coupled to the at least one processor and having instructions stored therein, wherein the instructions, when executed by the at least one processor, cause the electronic device to perform actions comprising:
receiving, in a processor-based machine learning system, at least one unlabeled sample and at least one labeled sample for training a pre-training model of the processor-based machine learning system, the pre-training model being used to extract features of the samples;
creating, in the processor-based machine learning system, an undirected graph associated with the pre-training model using the at least one unlabeled sample and a set of training samples associated with the pre-training model, wherein nodes in the undirected graph correspond to respective samples of the at least one unlabeled sample and the set of training samples, and edges between respective pairs of the nodes comprise respective weights each indicating a level of similarity between a corresponding one of the pairs of nodes;
dividing, in the processor-based machine learning system, the undirected graph to form a plurality of sub-graphs based on corresponding features of the unlabeled sample and the set of training samples, the plurality of sub-graphs corresponding to a plurality of classifications of the samples, respectively, wherein the plurality of sub-graphs comprise at least a positive sub-graph and a negative sub-graph, each of the positive sub-graph and the negative sub-graph comprising a respective different subset of the nodes corresponding to the respective samples of the at least one unlabeled sample and the set of training samples, the positive and negative sub-graphs being determined utilizing a contrastive learning loss function that separates positive sample pairs each classified as representing same objects from negative sample pairs each classified as representing different objects;
training, in the processor-based machine learning system, based on the plurality of sub-graphs and the at least one labeled sample, the pre-training model to generate a training model of the processor-based machine learning system;
wherein the training model is utilized to process at least portions of a plurality of images from captured video data as multiple additional samples, the processing comprising detecting at least first and second objects associated with respective regions of interest in at least one of the images and tracking the at least first and second detected objects across multiple additional images of the plurality of images, using the training model and one or more instances of dividing a corresponding undirected graph into sub-graphs each comprising a positive sub-graph and a negative sub-graph.

12. The electronic device according to claim 11, wherein creating the undirected graph comprises: determining, for the unlabeled sample and a first sample and a second sample in the set of training samples, a first node and a second node in the undirected graph corresponding to the first sample and the second sample, respectively.

13. The electronic device according to claim 12, wherein creating the undirected graph further comprises:
determining, based on the pre-training model, a first feature and a second feature of the first sample and the second sample, respectively; and
determining an edge between the first node and the second node based on a similarity between the first feature and the second feature.

14. The electronic device according to claim 13, wherein determining the edge comprises: updating the edge based on a perturbation factor describing sample noise.

15. The electronic device according to claim 13, wherein dividing the undirected graph to form the plurality of sub-graphs comprises:
determining, based on edges of the undirected graph, an entropy loss associated with the undirected graph; and
dividing, based on the entropy loss, the undirected graph to form the plurality of sub-graphs.

16. The electronic device according to claim 15, wherein determining the entropy loss comprises:
determining an indicator vector associated with a sub-graph in the plurality of sub-graphs; and
determining the entropy loss based on a separation degree between the indicator vector and the plurality of sub-graphs.

17. The electronic device according to claim 11, wherein training the pre-training model to generate the training model comprises:
determining, based on the plurality of sub-graphs, an entropy loss for updating the pre-training model;
determining, based on a priori knowledge, a priori knowledge loss for updating the pre-training model; and
updating the pre-training model based on the entropy loss and the a priori knowledge loss.

18. The electronic device according to claim 17, wherein updating the pre-training model comprises:

determining, based on the entropy loss and the a priori knowledge loss, an overall loss for updating the pre-training model; and updating a parameter of the pre-training model using the overall loss.

19. The electronic device according to claim 11, wherein the actions further comprise at least any one of:

iteratively executing the actions based on the at least one unlabeled sample and the at least one labeled sample; and extracting, in response to receiving a new sample to be processed, features of the new sample using the training model.

20. A computer program product that is tangibly stored on a non-transitory computer-readable medium and comprises machine-executable instructions, wherein the machine-executable instructions, when executed by a machine, cause the machine to perform actions comprising:

receiving, in a processor-based machine learning system, at least one unlabeled sample and at least one labeled sample for training a pre-training model of the processor-based machine learning system, the pre-training model being used to extract features of the samples;

creating, in the processor-based machine learning system, an undirected graph associated with the pre-training model using the at least one unlabeled sample and a set of training samples associated with the pre-training model, wherein nodes in the undirected graph correspond to respective samples of the at least one unlabeled sample and the set of training samples, and edges between respective pairs of the nodes comprise respective weights each indicating a level of similarity between a corresponding one of the pairs of nodes;

dividing, in the processor-based machine learning system, the undirected graph to form a plurality of sub-graphs based on corresponding features of the unlabeled sample and the set of training samples, the plurality of sub-graphs corresponding to a plurality of classifications of the samples, respectively, wherein the plurality of sub-graphs comprise at least a positive sub-graph and a negative sub-graph, each of the positive sub-graph and the negative sub-graph comprising a respective different subset of the nodes corresponding to the respective samples of the at least one unlabeled sample and the set of training samples, the positive and negative sub-graphs being determined utilizing a contrastive learning loss function that separates positive sample pairs each classified as representing same objects from negative sample pairs each classified as representing different objects;

training, in the processor-based machine learning system, based on the plurality of sub-graphs and the at least one labeled sample, the pre-training model to generate a training model of the processor-based machine learning system;

wherein the training model is utilized to process at least portions of a plurality of images from captured video data as multiple additional samples, the processing comprising detecting at least first and second objects associated with respective regions of interest in at least one of the images and tracking the at least first and second detected objects across multiple additional images of the plurality of images, using the training model and one or more instances of dividing a corresponding undirected graph into sub-graphs each comprising a positive sub-graph and a negative sub-graph.

* * * * *